(12) United States Patent
Veenje et al.

(10) Patent No.: US 12,187,500 B2
(45) Date of Patent: Jan. 7, 2025

(54) SIPLID FOR A CONTAINER HAVING A TWISTING EFFECT, AND METHOD FOR MANUFACTURING SUCH SIPLID

(71) Applicant: HUHTAMAKI MOLDED FIBER TECHNOLOGY B.V., Leeuwarden (NL)

(72) Inventors: Sandor Klaas Veenje, Workum (NL); Guillaume Daniel Bernard Peridy, Doix les Fontaines (FR)

(73) Assignee: HUHTAMAKI MOLDED FIBER TECHNOLOGY B.V., Leeuwarden (NL)

( * ) Notice: Subject to any disclaimer, the term of this patent is extended or adjusted under 35 U.S.C. 154(b) by 0 days.

(21) Appl. No.: 17/919,492

(22) PCT Filed: Apr. 16, 2021

(86) PCT No.: PCT/NL2021/050245
§ 371 (c)(1),
(2) Date: Oct. 17, 2022

(87) PCT Pub. No.: WO2021/210982
PCT Pub. Date: Oct. 21, 2021

(65) Prior Publication Data
US 2023/0356895 A1 Nov. 9, 2023

(30) Foreign Application Priority Data
Apr. 17, 2020 (NL) ........................................ 2025367

(51) Int. Cl.
*B65D 47/08* (2006.01)
*B65D 43/02* (2006.01)
(Continued)

(52) U.S. Cl.
CPC ..... *B65D 47/0847* (2013.01); *B65D 43/0212* (2013.01); *B65D 65/466* (2013.01);
(Continued)

(58) Field of Classification Search
CPC ............ B65D 47/0847; B65D 43/0212; B65D 65/466; B65D 2203/00; B65D 2251/1008;
(Continued)

(56) References Cited

U.S. PATENT DOCUMENTS 6,056,145 A * 5/2000 Rush ................... B65D 43/0231
220/784
2006/0255037 A1 11/2006 Hollis et al.
(Continued)

FOREIGN PATENT DOCUMENTS

JP 3190372 U * 5/2014 ......... B65D 43/0212
KR 101118890 B1 * 3/2012 .............. F21V 3/062
(Continued)

OTHER PUBLICATIONS

English translation JP 3190372. (Year: 2024).*
(Continued)

*Primary Examiner* — James N Smalley
(74) *Attorney, Agent, or Firm* — Husch Blackwell LLP

(57) ABSTRACT

The invention relates to a siplid 2, a container provided with such siplid and a method therefor. The siplid comprises: •—a container side 4, a consumer side 6, and a siplid plane 12 having a siplid axis 14; •—an edge 8 configured for surrounding a container opening to cover the container opening; •—a drinking opening 18 in the siplid having a length L substantially extending in the circumferential direction of the siplid, and having a width W substantially extending in the radial direction of the siplid; •—a moveable tab 20 configured for covering the opening in a closed position; •—a recess 22 configured for receiving the moveable tab in
(Continued)

Figure 1:
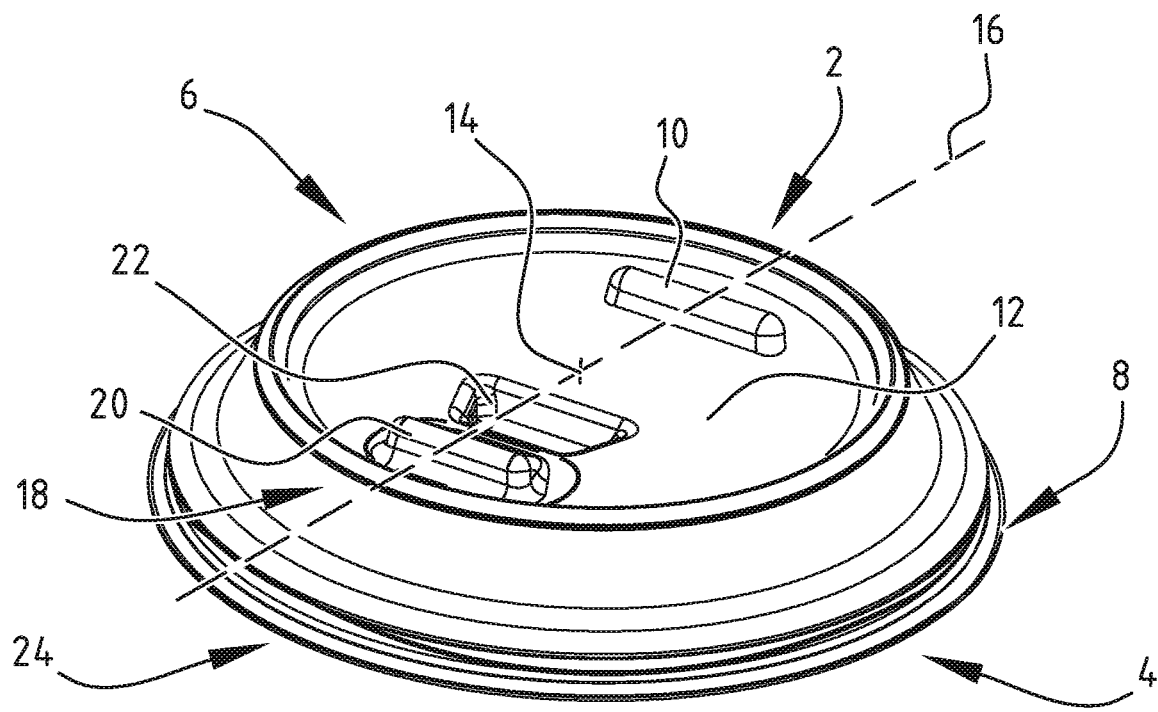

an open position; •—a hinge 32 configured for enabling rotational movement of the tab around a hinge axis; and •—a section line 16 extending in the siplid plane dividing the opening in two equal parts, and a division line 34 in between the opening and the recess extending substantially perpendicular to the section line wherein the hinge axis is provided at a lid angle to the division line.

16 Claims, 2 Drawing Sheets

(51) Int. Cl.
| | | |
|---|---|---|
| | *B65D 65/46* | (2006.01) |
| | *D21H 17/00* | (2006.01) |
| | *D21H 17/53* | (2006.01) |
| | *D21H 17/67* | (2006.01) |
| | *D21H 27/10* | (2006.01) |
| | *D21J 1/00* | (2006.01) |

(52) U.S. Cl.
CPC ........... *D21H 17/53* (2013.01); *D21H 17/675* (2013.01); *D21H 17/74* (2013.01); *D21H 27/10* (2013.01); *D21J 1/00* (2013.01); *B65D 2203/00* (2013.01); *B65D 2251/1008* (2013.01); *B65D 2543/00027* (2013.01); *B65D 2543/00046* (2013.01); *B65D 2543/00092* (2013.01); *B65D 2543/00268* (2013.01); *B65D 2543/00351* (2013.01); *B65D 2543/00527* (2013.01); *B65D 2543/00537* (2013.01); *B65D 2543/00629* (2013.01); *B65D 2543/00685* (2013.01); *B65D 2543/00731* (2013.01); *B65D 2543/00796* (2013.01)

(58) Field of Classification Search
CPC ........... B65D 2543/00027; B65D 2543/00046; B65D 2543/00092; B65D 2543/00268; B65D 2543/00351; B65D 2543/00527; B65D 2543/00537; B65D 2543/00629; B65D 2543/00685; B65D 2543/00731; B65D 2543/00796; B65D 47/10; B65D 2203/12; D21H 17/53; D21H 17/675; D21H 17/74; D21H 27/10; D21J 1/00; Y02W 90/10
See application file for complete search history.

(56) References Cited

U.S. PATENT DOCUMENTS

| | | | |
|---|---|---|---|
| 2011/0139800 A1* | 6/2011 | Urban | B29D 99/0096 229/404 |
| 2014/0048552 A1 | 2/2014 | Wang et al. | |
| 2019/0359393 A1 | 11/2019 | Layos et al. | |
| 2022/0097925 A1* | 3/2022 | Baird | B65D 43/0212 |

FOREIGN PATENT DOCUMENTS

| | | | | |
|---|---|---|---|---|
| WO | 0230783 A1 | 4/2002 | | |
| WO | WO-2018067006 A1 * | 4/2018 | | B65D 1/24 |

OTHER PUBLICATIONS

English translation of KR-101118890. (Year: 2024).*
International Search Report for PCT/NL2021/050245, European Patent Office, Jul. 20, 2021, 2 pages.

* cited by examiner

SIPLID FOR A CONTAINER HAVING A TWISTING EFFECT, AND METHOD FOR MANUFACTURING SUCH SIPLID

The present invention relates to a siplid for a container. Such siplid is typically used for a beverage container or cup.

Siplids are commonly used. More specifically siplids are often used for beverage containers, such as cups for soft drinks and coffee. For example, a so-called coffee-to-go is often supplied with a siplid. Such siplid comprises an opening, more specifically a drinking opening, and a clamping edge for providing the siplid to the opening of the drinking container. Some siplids provide a tab or lid to enable closing of the drinking opening. In these siplids the tab or lid is ruptured along a rupture line by a consumer or seller. After opening the tab or cover is positioned in a recess that is provided in the siplid to fixate the tab or cover and enabling a consumer to drink from the cup.

A problem with conventional siplids having a tab or lid is that such tab or lid is not fixated or locked thoroughly in the recess in the open or drinking position. This may hinder the consumer when drinking from the cup.

For this purpose the present invention provides a siplid for a container, the siplid comprising:
- a container side, a consumer side, and a siplid plane having a siplid axis;
- an edge configured for surrounding a container opening to cover the container opening;
- a drinking opening in the siplid having a length substantially extending in the circumferential direction of the siplid, and having a width substantially extending in the radial direction of the siplid;
- a moveable tab configured for covering the drinking opening in a closed position;
- a recess configured for receiving the moveable tab in an open position;
- a hinge configured for enabling rotational movement of the tab around a hinge axis; and
- a section line extending in the siplid plane dividing the opening in two equal parts, and a division line in between the opening and the recess extending substantially perpendicular to the section line,
- wherein the hinge axis is provided at a lid angle to the division line.

The container preferably relates to a liquid container, more specifically a container configured for holding a beverage. The container can be used for all kind of liquids, such as coffee, tea, water, soft drinks, milk. In the context of the present application the container includes a cup, or any other suitable liquid holder, that is provided with an opening and can be covered by a siplid. Often the container is provided with a circular opening and/or shape, although it will be understood that other shapes and openings can also be envisaged in accordance with the present application. Typically, the shape of the siplid is such that it fits to the container.

The siplid is typically provided with a container side and a consumer side and as a so-called siplid plane configured for covering the container opening, and wherein the siplid plane has a siplid axis. When in use, this siplid axis extends in a direction substantially perpendicular to the drinking opening of the container. The siplid axis preferably also extends in a direction substantially perpendicular to a clamping plane of the siplid defined by the clamping edge of the siplid. In some of the embodiments of the siplid according to the invention the siplid plane extends substantially perpendicular to this siplid axis. In other embodiments the siplid plane can be provided at a different angle relative to the siplid axis.

The siplid according to the invention comprises a movable tab that is configured for covering the opening in the closed position and is capable of performing a rotational movement when being transferred between the open and closed positions. In the context of the present application the movable tab also includes a movable cover or a movable lid or other suitable closing element. The tab can be rotated over a hinge axis that defines the rotational movement of the tab. In an open position the movable tab is stored and preferably fixated in a recess that is configured for receiving this tab in the open position. The recess is provided in the siplid plane. In a presently preferred embodiment the movable tab can be rotated over a rotation angle of about 180° around the hinge axis.

According to the present invention the hinge axis is provided at a lid angle to a division line. This division line extends substantially perpendicular to the section line. The section line extends in the siplid plane and divides the opening in two equal parts. By providing the hinge axis at a lid angle to this division line the movable tab undergoes a twisting effect or twisting movement when bringing the tab from a closed position to a open position or vice versa. This lid angle has as an effect that a guiding or lead-in effect is achieved when moving the tab into the recess. This renders opening the siplid easier for a consumer. Furthermore, the lock of the movable tab by the recess is improved due to is lid angle as compared to conventional siplids. This is achieved by the twisting effect that provides an additional locking force when the movable tab is provided in the recess in an open position. This prevents undesired release of the tab from the recess that may hinder the consumer when drinking from the container. As an even further effect of the provision of the lid angle the locking feature of the recess can be maintained over a wider range of manufacturing tolerances. Therefore, this better guarantees the locking effect for the siplids, when in use. Furthermore, this reduces the amount of product rejection in the manufacturing process for the siplids. This renders the manufacturing process more effective and reduces waste.

The siplid can be manufactured from a wide range of materials, including biodegradable materials, plastic materials, cellulose-based materials and other suitable materials. The siplids and parts can be moulded, pressed and/or cut.

In a preferred embodiment of the invention the lid angle is at least 0.45°, preferably at least 0.5°, more preferably at least 0.7°, and most preferably at least 0.85°.

Providing a relatively small lid angle already contributes to the locking effect. In fact, the angle provides a smooth twisting affect when moving the tab into the recess and/or vice versa.

Preferably, the lid angle is in the range of 0.45° to 7.5°, preferably in the range of 0.6° to 3.5°, more preferably in the range of 0.75° to 2°, and most preferably in the range of 0.9° to 1.2°.

Experiments showed an effective locking of the tab into the recess with a lid angle in the aforementioned range, preferably in the range of 0.75 to 2°, and most preferably with a lid angle of about 1°. Experiments showed that especially the range of 0.9 to 1.2 degrees is very effective in establishing a secure lock of the movable tab in the recess, specifically in a wide range of manufacturing tolerances.

Preferably, the lid angle lies in the siplid plane. By providing the lid angle in the siplid plane an optimal twisting effects is effectively achieved. This guarantees an efficient locking function.

In a further preferred embodiment of the invention the lid angle lies in a plane that is provided at an angle to the siplid plane.

In a further preferred embodiment of the invention the siplid is manufactured from a moulded pulp.

Manufacturing the siplid from a moulded pulp enables the manufacturing of a sustainable siplid as compared to conventional (plastic) siplids.

Preferably, the siplid is biodegradable.

In the context of this invention degradable relates to degradation resulting in loss of properties, while biodegradable relates to degradation resulting from the action of microorganisms such as bacteria, fungi and algae. Furthermore, in a presently preferred embodiment, the siplid is compostable. Compostable relates to degradation by biological process to yield carbon dioxide ($CO_2$), water, inorganic compounds and biomass.

In a further preferred embodiment of the invention the moulded pulp comprises an amount of a biodegradable aliphatic polyester.

Providing the matrix of moulded pulp of the siplid with an amount of biodegradable aliphatic polyester improves the properties of the siplid. Such biodegradable aliphatic polyester preferably involves one or more of poly(butylene succinate) also referred to as PBS, polybutylene sebacate terephthalate also referred to as PBST, polyhdroxyalkanoate also referred to as PHA, for example including polyhydroxybutyrate also referred to as PHB and/or poly(3-hydroxybutyrate-co-3-hydroxyhexanoate) also referred to as PHBH and/or poly(3-hydroxybutyrate-co-3-hydrovalerate) also referred to as PHBV, polycaprolactone also referred to as PCL, poly(lactic acid) also referred to as PLA, poly (glycolic acid) also referred to as PGA, polybutyleneadipate-terphthalate also referred to as PBAT and also known with its commercial name ecoflex, and/or other suitable components, such as poly(alkylene dicarboxylate) other than PBS, PBAT and PBST, poly(lactic-co-glycolic acid) also referred to as PLGA, including mixtures or blends. An example of such a blend is a blend of PBAT and PLA, or a blend of PBAT and PBS, or another suitable blend that is preferably home compostable. In some of the presently preferred embodiments of the invention the biodegradable aliphatic polyester is bio-based. This further improves the sustainability of the siplid of the invention.

Adding an amount of biodegradable aliphatic polyester improves the surface properties of the biodegradable siplid. This includes the so-called wipeability of the siplid. Wipeability relates to the possibility to remove stains from the surface and reducing or even preventing penetration into the material. Also, it may provide more possibilities for masking (hiding) undesirable stains and/or promoting the compostable effect of the siplid.

Furthermore, by including an amount of biodegradable aliphatic polyester the denesting properties of the siplids are improved, for example denesting a siplid from a stack of siplids.

In a preferred embodiment of the invention the amount of biodegradable aliphatic polyester in the moulded fiber matrix is in the range of 0.1 to 12 wt % of the siplid, preferably in the range of 0.5 to 8 wt %, more preferably in the range of 1 to 5 wt %, and most preferably in the range of 2 to 4 wt %.

By applying an amount of biodegradable aliphatic polyester in one of the aforementioned ranges, the sustainability and packaging characteristics of the siplid according to the present invention is significantly improved. Another advantage when using a biodegradable aliphatic polyester in a siplid is the constancy of size or dimensional stability.

In a preferred embodiment of the invention the biodegradable aliphatic polyester in the moulded fiber matrix comprises fibers.

Providing fibers of the biodegradable aliphatic polyester achieves a network of moulded and biodegradable aliphatic polyester fibers in the moulded fiber matrix. This further improves the strength of the siplid. In addition, it may improve barrier properties.

In a presently preferred embodiment of the invention the fibers comprise PBS and/or PBST and/or PBAT. Experiments have shown that the PBS fibers effectively melt into the matrix and form a strong network. This is also possible with PBST and/or PBAT fibers.

In a preferred embodiment of the invention the amount of non-fiber based material is below 25 wt %, preferably below 20 wt %, more preferably below 15 wt %, and most preferably below 10 wt %. Experiments showed that limiting the amount of non-fiber based material to the aforementioned upper limits improves the overall sustainability of the siplid. In an example, the moulded fiber matrix contains about 5 wt % of non-fiber based material and the multi-layer also contains about 5 wt % of non-fiber based material.

Optionally, the siplid comprises a colouring agent that is biodegradable and more preferably compostable. By providing a colouring agent the visual appearance of the siplid that is provided can be improved. Furthermore, this can be used to provide a consumer with additional information. For example, chocolate milk can be provided with a brown coloured siplid, coffee with a black coloured siplid, and soft drinks can be provided with an orange siplid, for example. It will be understood that these examples can be extended to other exchanges of information with a consumer.

In a presently preferred embodiment the matrix of the siplid comprises an amount of calcium carbonate.

Providing an amount of calcium carbonate provides a smoother surface to the siplid. This improves denesting properties and printability of the surface. In addition, it further reduces fiber swelling and penetration of compounds, such as coffee, into the matrix and/or fibers. Furthermore, dewatering is improved. This enables higher machine speeds in manufacturing the siplids and/or reduces the energy costs as less water needs to be evaporated in the drying process. In addition, providing an amount of calcium carbonate enhances the strength stiffness properties and can smoothen the surface to improve printability, and decoration in general. Calcium carbonate can be provided as a so-called filler material to the matrix and/or can be used in combination with other materials.

In a further embodiment of the present invention the siplid further comprises an amount of natural and/or alternative fibers.

Providing an amount of natural and/or alternative fibers provides a natural feel to the siplid and/or improves the overall strength and stability of the siplid. Such natural/alternative fibers may comprise fibers from different origin, specifically biomass fibers from plant origin. This biomass of plant origin may involve plants from the order of Poales including grass, sugar cane, bamboo and cereals including barley and rice. Other examples of biomass of plant origin are plants of the order Solanales including tomato plants of which the leaves and/or stems could be used, for example plants from the Order Arecales including palm oil plants of which leaves could be used, for example plants from the Order Maphighiales including flax, plants from the Order of Rosales including hemp and ramie, plants from the Order of Malvales including cotton, kenaf and jute. Alternatively, or in addition, biomass of plant origin involves so-called herbaceous plants including, besides grass type plants and some of the aforementioned plants, also jute, Musa including banana, Amarantha, hemp, cannabis etc. In addition or as an alternative, biomass material origination from peat and/or moss can be applied.

Preferably, the (lignocellulosic) biomass of plant origin comprises biomass originating from plants of the Family of Poaceae (to which is also referred to as Gramineae). This family includes grass type of plants including grass and barley, maize, rice, wheat, oats, rye, reed grass, bamboo, sugar cane (of which residue from the sugar processing can be used that is also referred to as bagasse), maize (corn), sorghum, rape seed, other cereals, etc. Especially the use of so-called nature grass provides good results when manufacturing siplids. Such nature grass may originate from a natural landscape, for example. This family of plants has shown good manufacturing possibilities in combination with providing a sustainable product to the consumer.

In another preferred embodiment the biomass of plant origin comprises material from the coffee plant (*Coffea*) in the family Rubiaceae. Optionally, this biomass is used in combination with other biomass. The coffee plant biomass can advantageously be used for coffee related products, such as coffee cups or containers.

Preferably, in one of the embodiments of the invention the siplid comprises an amount of micro fibrillated cellulose (MFC) sometimes also referred to as nanofibrillar cellulose or cellulose nanofibers or nanocellulose. MFC preferably originates from cellulose raw material of plant origin. The use of MFC enhances the fiber-fiber bond strength and further improves the reinforcement effect. Although MFC is preferably applied in combination with one or more of the biodegradable aliphatic polyesters, it is also possible to use MFC as an alternative to these components.

It will be understood that combinations of MFC and/or biodegradable aliphatic polyesters may further improve the mentioned effects and advantages. As a further example, a combination of biodegradable aliphatic polyester, such as PBS, PBAT, PBST with cellulose fibers significantly reduces the swelling of the siplid material. These cellulose fibers may be a mixture of short fiber hard wood pulp (e.g. birch) and long fiber soft wood pulp. In a presently preferred embodiment the long fibers have an average length of about 2 to 3 mm, and preferably about 2.5 mm, the short fibers have an average length of about 0.5 to 1.2 mm, and preferably about 0.9 mm.

In one of the presently preferred embodiments the moulded pulp matrix of the siplid comprises a mixture of MFC and calcium carbonate, more preferably with an amount of 5 to 10 wt % of the matrix.

In this or other embodiments of the invention the amount of calcium carbonate is in the range of 1 to 12 wt %, preferably in the range of 2.5 to 11 wt %, and most preferably in the range of 5 to 10 wt %. This even further improves product properties, such as strengthening of the product, smoothening of the surface of the product, enhancing denestability, improving printability, and being less sensitive for swelling. In addition, an amount of a biodegradable aliphatic polyester may be added to the matrix.

In addition, or as an alternative to calcium carbonate, other components can be included, optionally in a mixture with MFC, such as calcium stearate and Xelorext™. This components are preferably added in similar amounts and contribute to further improving the characteristics of the siplid according to the invention.

The invention further relates to a drinking container comprising a siplid according to one of the embodiments of the present invention.

Such drinking container provides similar effects and advantages as described in relation to the siplid.

The invention further also relates to a method for manufacturing a siplid according to an embodiment of the invention, the method comprising the steps of:
 providing a raw material;
 forming the siplid; and
 providing the hinge axis for the movable tab at a lid angle to the division line.

The method provide similar effects and advantages as described in relation to the siplid and/or drinking container. Preferably, the method involves the step of performing a twisting movement and moving the movable lid from the open position to the closed position. This twisting movement provides a secure lock of the tab in the recess.

Figure 2:
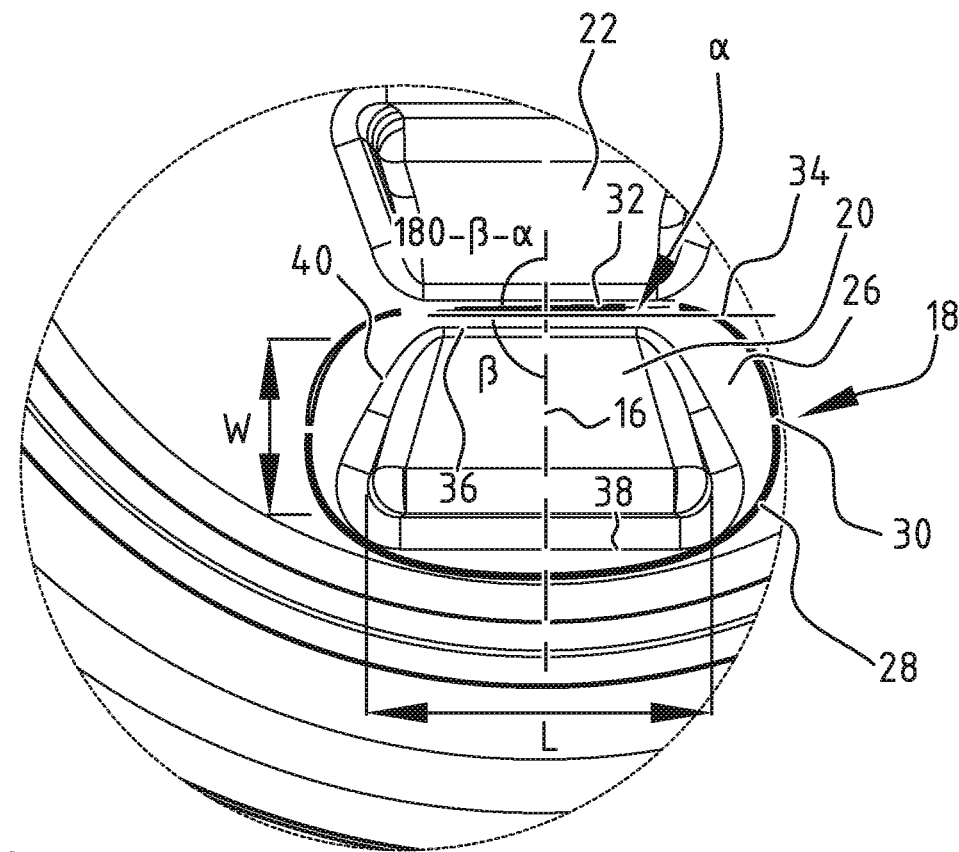
Figure 3:
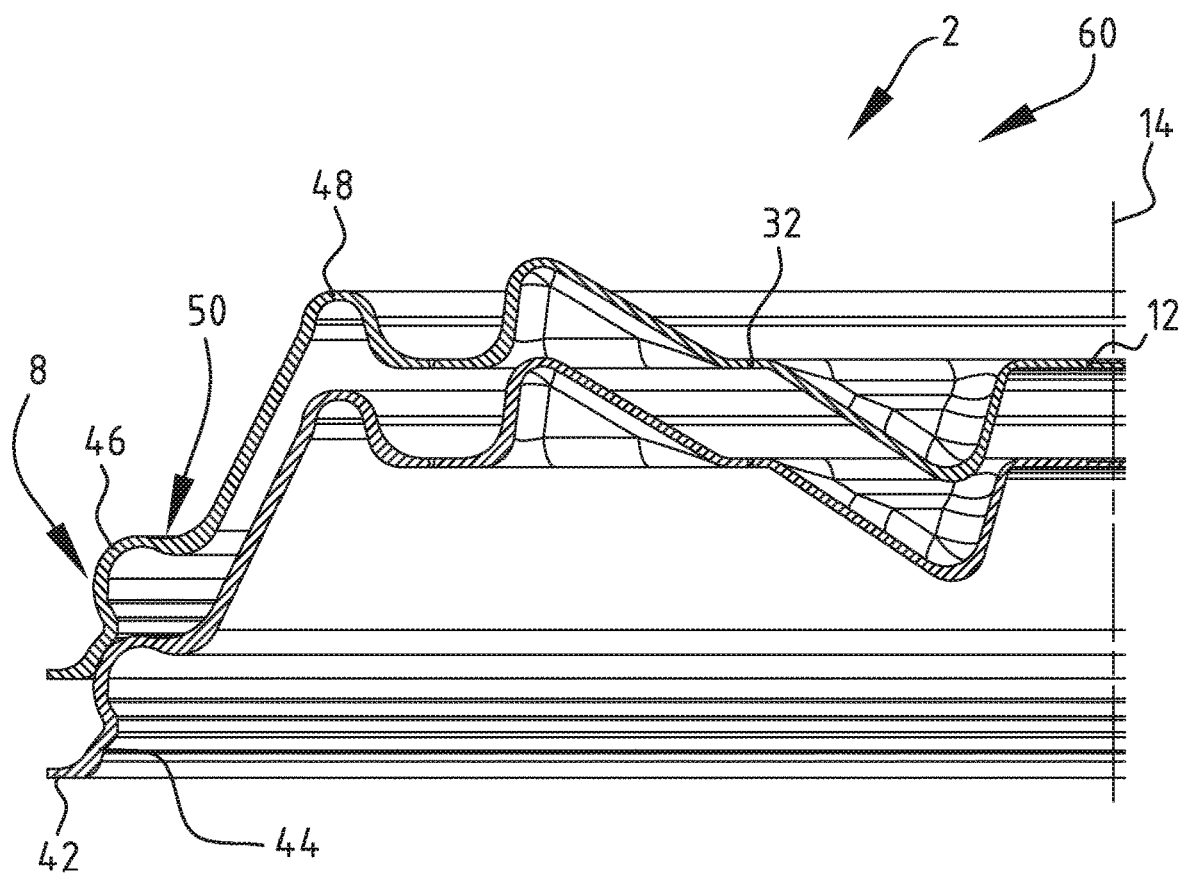
Figure 4:
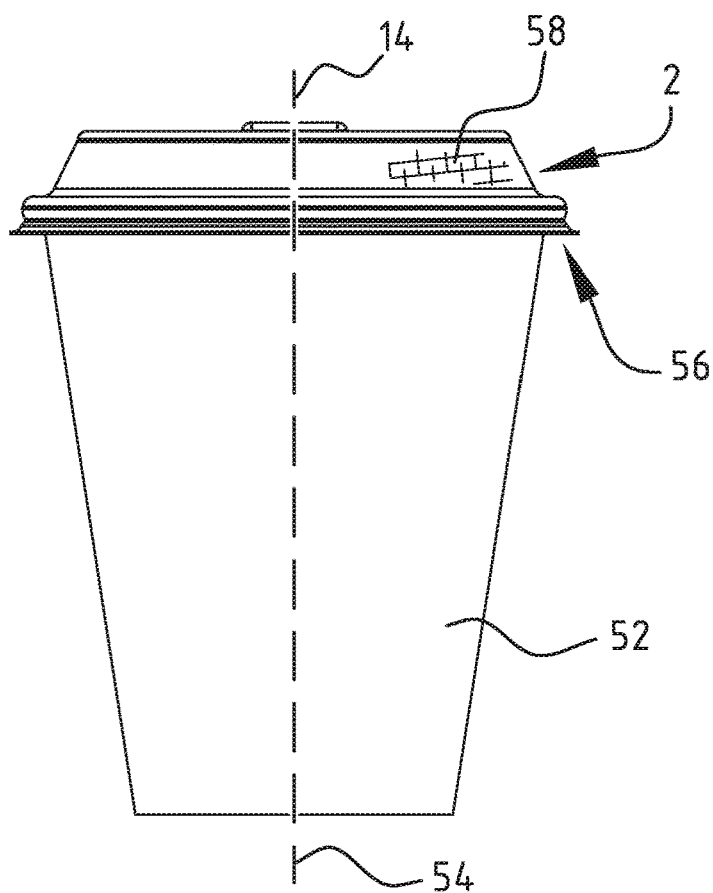

Further advantages, features and details of the invention are elucidated on the basis of preferred embodiments thereof, wherein reference is made to the accompanying drawings, in which:

FIG. 1 shows a siplid according to the present invention;
FIG. 2 shows a detail of the opening in the siplid of FIG. 1;
FIG. 3 shows a detail of a stack of siplids according to FIG. 1; and
FIG. 4 shows a drinking container that is provided with the siplid of FIG. 1.

Siplid 2 (FIG. 1) is provided with container side 4 and consumer side 6. Siplid 2 is further provided with clamping edge 8 that is configured for clamping around the bead-like mouth edge of a container. In the illustrated embodiment one or more markings and/or embossings 10 are provided to display information. Siplid 2 is further provided with siplid plane 12. In the illustrated embodiment lid axis 14 extends in a substantially perpendicular direction relative to siplid plane 12. Section line 16 is provided so that opening 18, tab 20 and recess 22 are divided in two (symmetric) parts. In the illustrated embodiment section line 16 extends substantially perpendicular to lid axis 14. In the illustrated embodiment siplid plane 12 is provided substantially parallel to a plane that is defined by clamping edge 8. Section line 16 extends substantially perpendicular relative to lid axis 14. It will be understood that siplid plane may be provided at an angle relative to the plane defined by clamping edge 8 in other embodiments. Optionally, undercut portions 24 are provided to improve the clamping of siplid 2 on a container.

Opening 18 in siplid 2 is defined by opening plane 26 within rupture line 28 that is connected with breaking elements 30 to siplid plane 12. Hinge 32 extends substantially parallel between opening 18 and recess 22 at a lid angle $\alpha$ relative to the division line extending between opening 18 and recess 22 and extending substantially perpendicular to section line 16. This division line is indicated in FIG. 2 with reference number 34. Hinge 32 is provided at an angle $\beta$ relative to section line 16. In the illustrated embodiment $\alpha+\beta$ is 90°. Opening 18 is provided with length L in a radial direction of siplid 2 and width W in a radial direction towards lid axis 14. Tab 20 is provided with tab upper side edge 36, tab lower side edge 38 and two tab side edges 40.

In the illustrated embodiment siplid 2 (FIG. 3) is provided with clamping edge 8 having an outward extending edge 42 and a collar portion 44. A first radial circumferential edge 46 is configured for clamping around the container edge. Furthermore, there is provided a second radial circumferential edge 48 and a groove 50 for liquid collection and allowing some resilient movement when positioning siplid 2 on a container.

Container 52 (FIG. 4) is provided with siplid 2. Container 52 has a container axis 54 and a container edge or bead-like mouth edge 56. In the illustrated embodiment lid axis 14 and container axis 54 extend in the same direction and overlap.

In the illustrated embodiment natural fibres 58 are provided in siplid 2.

When using siplid 2 it is often denested from stack 60 and then positioned above bead-like mouth edge 56 of container 52. Pushing siplid 2 downwards moves clamping edge 8 slightly outwards using some resilient movement that is (partly) enabled by groove 50. Pushing siplid 2 further downwards positions siplid 2 around edge 56. The, breaking elements 30 are ruptured, tab 20 is rotated around hinge 32 and is preferably positioned in recess 22. By pushing tab 20 downwards into recess 22 an efficient lock is achieved as a result of performing a twisting movement that is caused by providing hinge axis 32 at the lid angle α. Then, container 52 with siplid 2 is ready for use.

In the manufacturing process of siplid 2 first a moulded pulp material is prepared. Optionally, an amount of biodegradable aliphatic polyester, such as PBS and/or PBAT, is blended or mixed into the moulded pulp material. Preferably, the raw siplid is moulded and dried. Post-moulded operations can be performed involving decoration. Alternatively, or in addition thereto, an amount of natural fibres can be added to the moulded pulp. Also optionally, a refining step can be performed to the material of the moulded pulp.

Experiments were performed with siplid 2. For example, measurements at a temperature of about 23° and a relative humidity of about 50% involved a compression test. This showed a sufficient compression value that is even better as compared to conventional siplids. Other tests related to further properties of the siplid, such as denesting. It is noted that experiments showed that providing an amount of biodegradable aliphatic polyester in the moulded fibre improves denesting properties of the siplid from a stack over a range of conditions.

The present invention is by no means limited to the above described preferred embodiments thereof. The rights sought are defined by the following claims, within the scope of which many modifications can be envisaged.

The invention claimed is:

1. A siplid for a container, comprising:
    a container side, a consumer side, and a siplid plane having a siplid axis;
    an edge configured for surrounding a container opening to cover the container opening;
    a drinking opening in the siplid having a length substantially extending in the circumferential direction of the siplid, and having a width substantially extending in the radial direction of the siplid;
    a moveable tab configured for covering the opening in a closed position;
    a recess configured for receiving the moveable tab in an open position;
    a hinge configured for enabling rotational movement of the tab around a hinge axis; and
    a section line extending in the siplid plane dividing the opening in two equal parts, and a division line in between the opening and the recess extending perpendicular to the section line,
    wherein the hinge axis is provided at a lid angle to the division line, and wherein the lid angle is in the range of 0.6° to 3.5°.

2. The siplid according to claim 1, wherein the lid angle lies in the siplid plane.

3. The siplid according to claim 1, wherein the lid angle lies in a plane at an angle to the siplid plane.

4. The siplid according to claim 1, wherein the siplid is manufactured from a moulded pulp.

5. The siplid according to claim 1, wherein the siplid is biodegradable.

6. The siplid according to claim 5, wherein the siplid is compostable.

7. The siplid according to claim 5, wherein the moulded pulp comprises an amount of a biodegradable aliphatic polyester.

8. The siplid according to claim 4, wherein the moulded pulp comprises an amount of calcium carbonate.

9. The siplid according to claim 4, wherein the moulded pulp comprises an amount of natural fibers and/or alternative fibers.

10. A method for manufacturing a siplid according to claim 1, comprising the steps of:
    providing a raw material;
    forming the siplid; and
    providing the hinge axis for the movable tab at a lid angle to the division line.

11. The method according to claim 10, further comprising the step of performing a twisting movement when moving the moveable lid from the open position to the closed position.

12. The siplid according to claim 1, wherein the lid angle is at least 0.7°.

13. The siplid according to claim 1, wherein the lid angle is at least 0.85°.

14. The siplid according to claim 1, wherein the lid angle is in the range of 0.75° to 2°.

15. The siplid according to claim 1, wherein the lid angle is in the range of 0.9° to 1.2°.

16. A drinking container comprising a siplid according to claim 1.

* * * * *